United States Patent [19]
Fields et al.

[11] 3,880,908
[45] Apr. 29, 1975

[54] URETHANE DERIVATIVES OF POLYMETHYL BIPHENYL USEFUL AS FUNGICIDES

[75] Inventors: Ellis K. Fields, River Forest; Imre Puskas, Glen Ellyn, both of Ill.

[73] Assignee: Standard Oil Company, Chicago, Ill.

[22] Filed: Jan. 24, 1972

[21] Appl. No.: 220,367

[52] U.S. Cl............ 260/471 C; 71/111; 260/479 C; 424/300
[51] Int. Cl............................................ C07c 125/06
[58] Field of Search ..................... 260/471 C, 479 C

[56] References Cited
UNITED STATES PATENTS
3,632,631  1/1972  Wright............................ 260/479 C

*Primary Examiner*—Lorraine A. Weinberger
*Assistant Examiner*—L. A. Thaxton
*Attorney, Agent, or Firm*—Gunar J. Blumberg; Arthur G. Gilkes; William T. McClain

[57] ABSTRACT

Novel urethane derivatives of polymethyl biphenyl useful as fungicides and also having insecticidal, miticidal and nematocidal activities are disclosed. These products are prepared by reacting the appropriate alkyl or aryl isocyanate with the hydroxy polymethylbiphenyl at temperatures of 0° to 35°C. to produce the corresponding urethane derivatives of polymethyl biphenyl.

17 Claims, No Drawings

URETHANE DERIVATIVES OF POLYMETHYL BIPHENYL USEFUL AS FUNGICIDES

This invention relates to novel urethane derivatives of polymethyl biphenyl. More particularly, this invention relates to urethane derivatives of polymethyl biphenyls having the following formula:

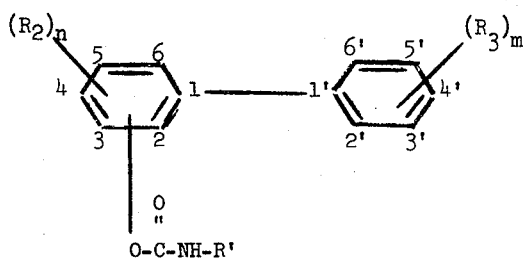

wherein the

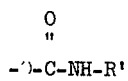

group occupies the two or three position on the phenyl ring, R' is an alkyl, aryl or substituted aryl group and $R_2$ and $R_3$ are methyl groups and $n$ and $m$ are integers having values from 2 through 4 inclusive.

These novel compositions have extraordinary fungicidal activity. The compositions of this invention are effective fungicides as well as insecticides, miticides, nematocides and herbicides. To get the novel fungicidal compositions the amino biphenyls having the following structure

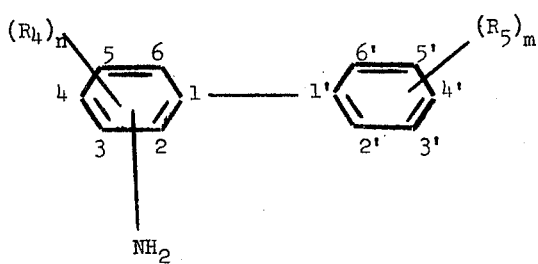

wherein the amino group occupies the 2 or 3 position on the phenyl ring and $R_4$ and $R_5$ are methyl groups and $n$ and $m$ are integers having values from 2 to 4 inclusive are diazotized and hydrolyzed as described in *J. Organic Chemistry* 33, 4237 (1968) to produce the phenols having the following structure:

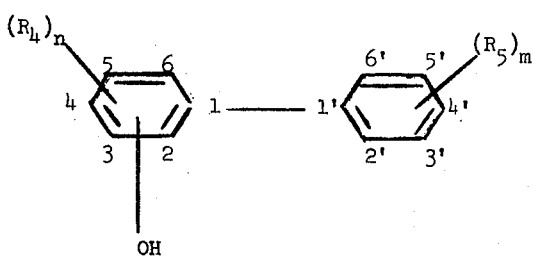

These phenols are reacted with the appropriate alkyl or aryl isocyanate under anhydrous conditions with pyridine or dibutyltindiacetate catalysts to obtain the urethane compounds shown on page 1.

A best mode for preparing one of the novel biphenyl urethanes follows:

To a stirred solution of 3-hydroxy-2,3', 4,4', 6-pentamethylbiphenyl in methylene dichloride, methyl isocyanate and dibutyltindiacetate were added. Approximately one hour later the solvents were removed in vacuo and a foamy solid of the product 2,3',4,4',6-pentamethylbiphenyl-3-yl-N-methyl carbamate melting around 57°–65°C. was recovered. It was characterized by infrared spectroscopy showing characteristic bands at 3250 and 1710 cm⁻¹. The product, upon testing for foliar fungicidal efficacy, showed effective control for bean mildew, bean rust and leaf rust of wheat and other uses as shown in Tables I and II.

The following novel urethane biphenyls were prepared:

2,3', 4,4', 6-pentamethylbiphenyl-3-yl-N-methyl carbamate

3', 4,4',5-tetramethylbiphenyl-2-yl-N-ethyl carbamate

3',4,4', 5-tetramethylbiphenyl-2-yl-N-n-propyl carbamate

3',4,4',5-tetramethylbiphenyl-2-yl-N-methyl carbamate 2,3',4,4',6-pentamethylbiphenyl-3-yl-N-ethyl carbamate 2,3', 4,4',6-pentamethylbiphenyl-3-yl-N-n-propyl carbamate 2,3',4,4',6-pentamethylbiphenyl-3-yl-N-phenyl carbamate 2,3',4,4',6-pentamethylbiphenyl-3-yl-N-o-nitrophenyl carbamate 2,3',4,4',6-pentamethylbiphenyl-3-yl-N-o-chlorophenyl carbamate 3',4,4',5-tetramethylbiphenyl-2-yl-N-phenyl carbamate 3',4,4',5-tetramethylbiphenyl-2-yl-N-o-nitrophenyl carbamate 3',4,4',5-tetramethylbiphenyl-2-yl-N-o-chlorophenyl carbamate 3',4,4',5-tetramethylbiphenyl-2-yl-N-m-nitrophenyl carbamate 2,3',4,4',6-pentamethylbiphenyl-3-yl-N-m-nitrophenyl carbamate 2',4,4',5,5'-pentamethylbiphenyl-2-yl-N-methyl carbamate 3,3',4,4',5,6-hexamethylbiphenyl-2-yl-N-methyl carbamate The invention is further illustrated in the following examples:

EXAMPLE I

Methyl isocyanate (2.8 ml.) and dibutyltindiacetate (one drop) were added to a stirred solution of 3-hydroxy-2,3',4,4',6-pentamethylbiphenyl (2.39 g.) in methylene dichloride (15 ml.). One hour later the solvents were removed in vacuo. Residual syrup did not crystallize; it became a foamy solid on vaccum drying at 0.1 mm. The 2,3',4,4',6-pentamethylbiphenyl-3-yl-N-methyl carbamate melted around 57°–65°C. Its IR spectrum showed the N—H and C=O bands at 3250 and 1710 cm⁻¹, respectively (in Nujol mull). The foliar fungal efficacy of 2,3'4,4',6-pentamethylbiphenyl-3-yl-N-methyl carbamate is shown in Tables I and II below:

3,880,908

TABLE I

| Foliar Disease | Treatment Applied | Amount Applied (p.p.m.) | % Disease Control |
|---|---|---|---|
| Bean Mildew | Product of Example I | 100 | 100 |
|  |  | 50 | 100 |
|  |  | 25 | 100 |
| Bean Rust | Product of Example I | 100 | 100 |
|  |  | 50 | 100 |
|  |  | 25 | 99 |
| Leaf Rust of Wheat | Product of Example I | 100 | 97 |
|  |  | 50 | 75 |
|  |  | 25 | 39 |

TABLE II

FOLIAR FUNGICIDAL EFFICACY OF 2,3',4,4',6-PENTAMETHYL-3-yl-N-METHYL CARBAMATE

| Conc. PPM | Early Blight | Late Blight | Leaf Rust | Powdery Mildew | Leaf Spot | Rice Blast | Bean Rust | Bean Mildew | Wheat Mildew |
|---|---|---|---|---|---|---|---|---|---|
| 1000 | 77 | 99 | 98 | 90 | 81 |    | 83 | 100 |    |    |
| 500 | 66 | 98 | 99 | 100 | 73 | 83 | 100 |    |    |
| 250 | 65 | 96 | 98 | 59 | 49 | 80 | 100 |    |    |
| 200 |    |    |    |    |    |    |    | 100 | 95 |
| 100 | 49 | 89 | 94 | 51 | 0 | 54 | 100 | 100 | 73 |
| 100 |    | 85 | 99 |    |    |    |    |    |    |
| 50 |    | 60 | 89 |    |    |    | 99 | 99 | 43 |
| 25 |    | 38 | 68 |    |    |    |    |    |    |

EXAMPLE II

Ethyl isocyanate (0.85 g.) and dibutyltindiacetate (one drop) were added to a stirred solution of 2-hydroxy-3',4,4',5-tetramethylbiphenyl (2.0 g.) in methylene dichloride (15 ml.). The reaction flask with an open neck was placed into a hood. On slow evaporation of the solvents crystals deposited. These were washed with hexane-carbon tetrachloride (20:1). The white product, 3',4,4',5-tetramethylbiphenyl-2-yl-N-ethyl carbamate (2.70 g.), melted unsharp around 70°–90°C. Its IR spectrum showed the N—H and C=O bands at 3250 and 1710 cm$^{-1}$, respectively (in Nujol mull).

EXAMPLE III n-Propyl isocyanate (0.9 g.) and dibutyltindiacetate (1 drop) were added to a stirred solution of 2-hydroxy-3',4,4',5-tetramethylbiphenyl (2.10 g.) in methylene dichloride (15 ml.). The reaction flask with an open neck was placed into a hood. A syrup was left after slow evaporation of the solvents. This crystallized slowly on being triturated with hexane. The white product, 3',4,-4',5-tetramethylbiphenyl-2-yl-N-n-propyl carbamate, (2.25 g.) melted at 54°–60°C. Its IR spectrum showed the N—H and C=O bands at 3360 and 1725 cm$^{-1}$, respectively (in Nujol mull).

EXAMPLE IV

Methyl isocyanate (2.2 ml., in excess) and dibutyltindiacetate (1 drop) were added to a stirred solution of 2-hydroxy-3',4,4',5-tetramethylbiphenyl (2.25 g.) in methylene dichloride (15 ml.). One hour later the solvents were removed in vacuo. Residual syrup slowly crystallized on being triturated with hexane. The white product, 3',4,4',5-tetramethylbiphenyl-2-yl-N-methyl carbamate (2.78 g.) melted at 76.5°–78.5°C. Its IR spectrum showed the N—H and C=O bands at 3300 and 1720 cm$^{-1}$, respectively (in Nujol mull).

EXAMPLE V

Ethyl isocyanate (0.9 g.) and dibutyltindiacetate (two drops) were added to a stirred solution of 3-hydroxy-2,3',4,4',6-pentamethylbiphenyl (2.0 g.) in methylene dichloride (15 ml.). The reaction flask with an open neck was placed into a hood. A syrup was left after slow evaporation of the solvents that became a foamy solid on vacuum drying at 0.1 mm. This crude 2,3',4,4',6-pentamethylbiphenyl-3-yl-N-ethyl carbamate melted in the 35°–50°C. range. Its IR spectrum showed the N—H and C=O bands at 3300 and 1725 (broad) cm$^{-1}$, respectively (in Nujol mull).

EXAMPLE VI n-Propyl isocyanate (0.9 g.) and dibutyltindiacetate (2 drops) were added to a stirred solution of 3-hydroxy-2,3',4,4',6-pentamethylbiphenyl (2.13 g.) in methylene dichloride (15 ml.). The reaction flask with an open neck was placed into a hood. A syrup was left after slow evaporation of the solvents. This was vacuum dried at 0.1 mm. Residue was dissolved in hexane. On slow evaporation of the solvent the product, 2,3',4,4',-6-pentamethylbiphenyl-3-yl-N-n-propyl carbamate, separated in a crystalline form, m.p. 86°–91°C. Its IR spectrum showed the N—H and C=O bands at 3270 and 1710 cm$^{-1}$, respectively (in Nujol mull).

EXAMPLE VII

Phenyl isocyanate (0.8 g.) and anhydrous triethylamine (2 drops) were added to a stirred solution of 3-hydroxy-2,3',4,4',6-pentamethylbiphenyl (1.6 g.) in methylene dichloride. After overnight standing the solvent was removed in vacuo. The residue crystallized on scratching in the presence of a few drops of hexane. The white product, 2,3',4,4',6-pentamethylbiphenyl-3-yl-N-phenyl carbamate (or by other name, 2,3',4,4',-6-pentamethylbiphenyl-3-yl carbanilate), melted at 154°–155°C. Its IR spectrum showed the N—H and C=O bands at 3250 and 1720 cm$^{-1}$, respectively (in Nujol mull).

EXAMPLE VIII o-Nitrophenylisocyanate (1.15 g, Eastman Organic Chemicals) was dissolved in methylene dichloride and filtered from the insolubles. The filtrate and triethylamine (three drops) were added to a stirred solution of 3-hydroxy-2,3',4,4',6-pentamethylbiphenyl (1.5 g.) in methylene dichloride (10 ml.). The workup procedure of Example VII gave a pale yellow crystalline powder, 2,3',4,4',6-pentamethylbiphenyl-3-yl-N-o-nitrophenyl carbamate (or, by other name, 2,3',4,4',6-pentamethylbiphenyl-3-yl o-nitro-carbanilate), (2.26 g.) m.p. 125°–127°C. Its IR spectrum showed the N—H and C=O bands at 3280 and 1755 cm⁻¹, respectively (in Nujol mull).

EXAMPLE IX

The reaction and workup was similar to Example VIII but, in place of o-nitrophenylisocyanate, o-chlorophenylisocyanate was used. The white product, 2,3',4,4',6-pentamethylbiphenyl-3-yl-N-o-chlorophenyl carbamate (or, by other name, 2,3',4,4',-6-pentamethylbiphenyl-3-yl o-chlorocarbanilate) (crude) melted at 93°–97°C.

EXAMPLE X

Phenyl isocyanate (0.8 g.) and 2-hydroxy-3',4,4',5-tetramethylbiphenyl (1.5 g.) were dissolved in methylene dichloride (30 ml.). Two drops of anhydrous triethylamine were added. After overnight standing the solvent was removed in vacuo and the residue crystallized in contact with hexane. The white product, 3',4,4',5-tetramethylbiphenyl-2-yl-N-phenyl carbamate (or, by other name, 3',4,4',5-tetramethylbiphenyl-2-yl carbanilate) (2.17 g.) melted at 130°–132°C. Its IR spectrum showed the N—H and C=O bands at 3240 and 1716 and 1732 (split) cm⁻¹, respectively (in Nujol mull).

EXAMPLE XI

The reaction and workup was similar to Example X, but in place of phenylisocyanate, o-nitrophenylisocyanate (1.15 g.) was used. The pale yellow product, 3',4,4',5-tetramethylbiphenyl-2-yl-N-o-nitrophenyl carbamate (or, by alternative name, 3',4,4'-',5-tetramethylbiphenyl-2-yl o-nitrocarbanilate), melted at 131°–133°C. Its IR spectrum showed the expected N—H and C=O bands at 3340 and 1770 cm⁻¹, respectively (in Nujol mull).

EXAMPLE XII

The reaction and the workup was similar to Example X, but in place of phenylisocyanate, o-chlorophenylisocyanate was used. The crude white product, 3',4,4',5-tetramethylbiphenyl-2-yl-N-o-chlorophenyl carbamate (or, by alternative name, 3',4-,4',5-tetramethylbiphenyl-2-yl o-chlorocarbanilate) melted at 81°–85°C. Its IR spectrum showed the N—H and C=O bands at 3350 and 1755 cm⁻¹, respectively (in Nujol mull).

EXAMPLE XIII

The reaction and workup was similar to Example X, but in place of phenylisocyanate, m-nitrophenylisocyanate (1.15 g.) was used. The pale yellow product, 3',4,4',5-tetramethylbiphenyl-2-yl-N-m-nitrophenyl carbamate (or, by alternative name, 3',4,4-',5-tetramethylbiphenyl-2-yl m-nitrocarbanilate) (2.41 g.) melted unsharp around 60°–70°C. Its IR spectrum showed the N—H and C=O bands at 3250 and 1730 cm⁻¹, respectively (in Nujol mull).

EXAMPLE XIV m-Nitrophenylisocyanate) (1.15 g.) and 3-hydroxy-2,3',4,4',6-pentamethylbiphenyl (1.6 g.) were dissolved in methylene dichloride (30 ml.). Two drops of anhydrous triethylamine were added. The workup method of Example X gave off-white product, 2,3',4,4-',6-pentamethylbiphenyl-3-yl-N-m-nitrophenyl carbamate (2.49 g.) m.p. 162°–165°C. Its IR spectrum showed the N—H and C=O bands at 3240 and 1720 cm⁻¹, respectively (in Nujol mull).

EXAMPLE XV

Methyl isocyanate (2.0 ml.) and dibutyltindiacetate (4 drops) were added to a stirred solution of 2-hydroxy-2',4,4',5,5'-pentamethylbiphenyl (1.9 g.) in methylene dichloride (15 ml.). After 30 minutes standing the mixture was refluxed for 20 minutes, and then taken to dryness in vacuo. Residual syrup crystallized in contact with hexane. The white product, 2',4,4',5,5'-pentamethylbiphenyl-2-yl-N-methyl carbamate (2.3 g.) melted at 114°–116°C. Its IR spectrum showed the expected N—H and C=O bands at 3320 and 1715 cm⁻¹, respectively (in Nujol mull).

EXAMPLE XVI

Methyl isocyanate (2.0 ml.) and dibutyltindiacetate (2 drops) were added to a stirred solution of 2-hydroxy-3,3',4,4',5,6-hexamethylbiphenyl (1.60 g.) in methylene dichloride (15 ml.). Two hours later the solvents were removed in vacuo. The residual syrup crystallized on being triturated with hexane. The white product, 3,3',4,4',5,6-hexamethylbiphenyl-2-yl-N-methyl carbamate (1.8 g.) melted 130°–133°C. Its IR spectrum showed the N—H and C=O bands at 3320 and 1720 cm⁻¹, respectively.

We claim:

1. A urethane derivative of polymethyl biphenyl having the following formula:

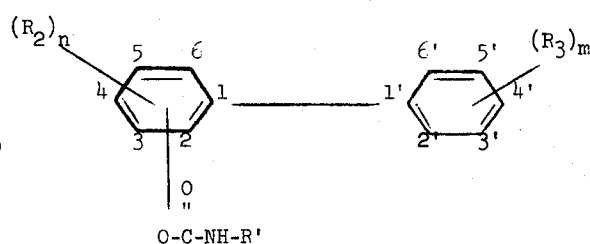

wherein the

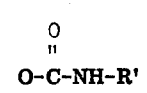

group occupies the 2 or 3 position on the phenyl ring, and wherein R' is a lower alkyl, phenyl, nitrophenyl or chlorophenyl group, $R_2$ and $R_3$ are methyl groups and $n$ and $m$ are integers having values from 2 through 4, inclusive.

2. A urethane derivative of polymethyl biphenyl having the following formula:

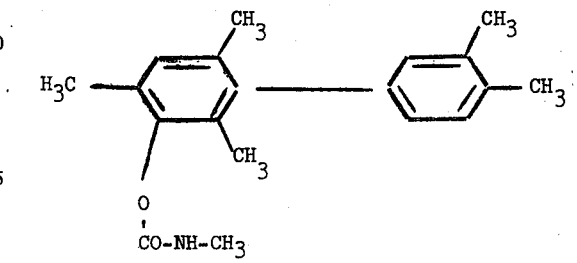

3. A urethane derivative of polymethyl biphenyl having the following formula:

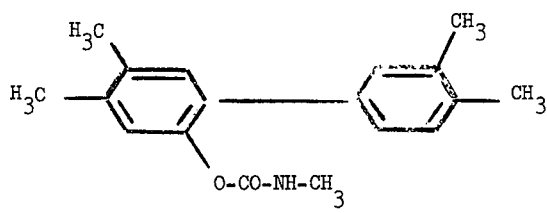

4. The compound of claim 1 wherein R' is an ethyl group, n and m are integers each having a value of 2 and wherein the methyl groups are attached on the 4,5 and 4',5' positions on the biphenyl rings and the

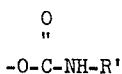

group occupies the 2 position on the biphenyl ring.

5. The compound of claim 1 wherein R' is a propyl group, n and m are integers each having a value of 2 and wherein the propyl groups are attached on the 4,5 and 4',5' positions on the biphenyl rings and the

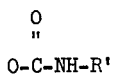

group occupies the 2 position on the biphenyl ring.

6. The compound of claim 1 wherein R' is an ethyl group, n is an integer having a value of 3, and m is an integer having a value of 2, and wherein the methyl groups are attached on the 2,4,6 and 4',5' positions on the biphenyl rings and the

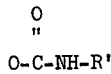

group occupies the 3 position on the biphenyl ring.

7. The compound of claim 1 wherein R' is a propyl group, n is an integer having a value of 3, and m is an integer having a value of 2, and wherein the methyl groups are attached on the 2,4,6 and 4',5' positions on the biphenyl rings and the

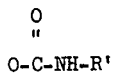

group occupies the 3 position on the biphenyl ring.

8. The compound of claim 1 wherein R' is a phenyl group, n is an integer having a value of 3, and m is an integer having a value of 2, and wherein the methyl groups are attached on the 2,4,6 and 4',5' positions on the biphenyl rings and the

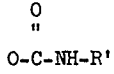

group occupies the 3 position on the biphenyl ring.

9. The compound of claim 1 wherein R' is a nitrophenyl group wherein the nitro group is attached in the ortho position on the phenyl ring, n is an integer having a value of 3, and m is an integer having a value of 2, and wherein the methyl groups are attached on the 2,4,6 and 4',5' positions on the biphenyl rings and the

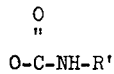

group occupies the 3 position on the biphenyl ring.

10. The compound of claim 1 wherein R' is a chlorophenyl group wherein the chlorine is attached in the ortho position on the phenyl ring, n is an integer having a value of 3 and m is an integer having a value of 2, and wherein the methyl groups are attached on the 2,4,6 and 4',5' positions on the biphenyl rings and the

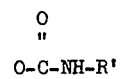

group occupies the 3 position on the biphenyl ring.

11. The compound of claim 1 wherein R' is a phenyl group, n and m are integers each having a value of 2 and wherein the methyl groups are attached on the 4,5 and 4',5' positions on the biphenyl rings and the

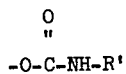

group occupies the 2 position on the biphenyl ring.

12. The compound of claim 1 wherein R' is a nitrophenyl group wherein the nitro group is attached in the ortho position on the phenyl ring, n and m are integers each having a value of 2 and wherein the methyl groups are attached on the 4,5 and 4',5' positions on the biphenyl rings and the

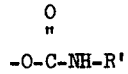

group occupies the 2 position on the biphenyl ring.

13. The compound of claim 1 wherein R' is a chlorophenyl group wherein the chlorine is attached in the ortho position on the phenyl ring, n and m are integers each having a value of 2 and wherein the methyl groups are attached on the 4,5 and 4',5' positions on the biphenyl rings and the

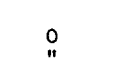

group occupies the 2 position on the biphenyl ring.

14. The compound of claim 1 wherein R' is a nitrophenyl group wherein the nitro group is attached in the meta position on the phenyl ring, n and m are integers each having a value of 2 and wherein the methyl groups are attached on the 4,5 and 4',5' positions on the biphenyl rings and the

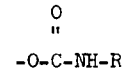

group occupies the 2 position on the biphenyl ring.

15. The compound of claim 1 wherein R' is a nitrophenyl group wherein the nitro group is attached in the meta position on the phenyl ring, *n* is an integer having a value of 3 and *m* is an integer having a value of 2, and wherein the methyl groups are attached on the 2,4,6 and 4',5' positions on the biphenyl rings and the

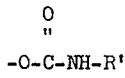

group occupies the 3 position on the biphenyl ring.

16. The compound of claim 1 wherein R' is a methyl group, *n* is an integer having a value of 2 and *m* is an integer having a value of 3 and wherein the methyl groups are attached on the 4,5 and 3',4',6' positions on the biphenyl rings and the

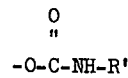

group occupies the 2 position on the biphenyl ring.

17. The compound of claim 1 wherein R' is a methyl group, *n* is an integer having a value of 4 and *m* is an integer having a value of 2, and wherein the methyl groups are attached on the 3,4,5,6 and 4',5' positions on the biphenyl ring, and the

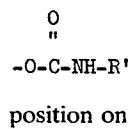

group occupies the 2 position on the biphenyl ring.

* * * * *